United States Patent [19]

Krooss

[11] 4,146,124
[45] Mar. 27, 1979

[54] BOTTLE FEEDING AND ALIGNING MECHANISM

[76] Inventor: Robert J. Krooss, 74 Ball Rd., Mountain Lakes, N.J. 07046

[21] Appl. No.: 815,176

[22] Filed: Jul. 13, 1977

[51] Int. Cl.² ............................................. B65G 47/26
[52] U.S. Cl. ..................................... 198/456; 198/626
[58] Field of Search ............... 198/400, 416, 417, 448, 198/452, 454, 456, 626, 627, 628, 399, 458, 817

[56] References Cited

U.S. PATENT DOCUMENTS

| | | | |
|---|---|---|---|
| 3,193,076 | 7/1965 | Creed | 198/461 |
| 3,305,069 | 2/1967 | Griner | 198/452 |
| 3,743,076 | 7/1973 | Hooks | 198/400 |
| 3,802,549 | 4/1974 | Kinsey | 198/627 |
| 4,034,844 | 7/1977 | Deak et al. | 198/400 |

FOREIGN PATENT DOCUMENTS

| | | | |
|---|---|---|---|
| 112504 | 12/1968 | Denmark | 198/448 |
| 2449109 | 4/1975 | Fed. Rep. of Germany | 198/400 |

*Primary Examiner*—Robert B. Reeves
*Assistant Examiner*—Richard K. Thomson

*Attorney, Agent, or Firm*—Stephen E. Feldman; Marvin Feldman

[57] ABSTRACT

A pair of spaced and aligned driven bottle aligning belts is disposed to each side of a bottle feed path for coaction with bottles having necks, to facilitate movement of said bottles while on their sides and being fed along the feed path. The pairs of belts on each side of said feed path approach each other, in the direction of bottle feed, so as to narrow the feed path; and by doing so to align the bottles for subsequent processing. Pairs of spaced rails are disposed downstream in said feed path and to each side thereof to receive the aligned bottles as they exit the bottle aligning belts to maintain the bottles in aligned relationship until the bottles are fed into a twister which up-ends the bottles and directs them further along the feed path to work stations where they are cleaned, filled, capped, and otherwise processed. Suitable drive belts are provided for feeding the bottles along said feed path, with appropriate drives and controls to facilitate operation thereof. Back ups or guards are provided for the belts.

8 Claims, 6 Drawing Figures

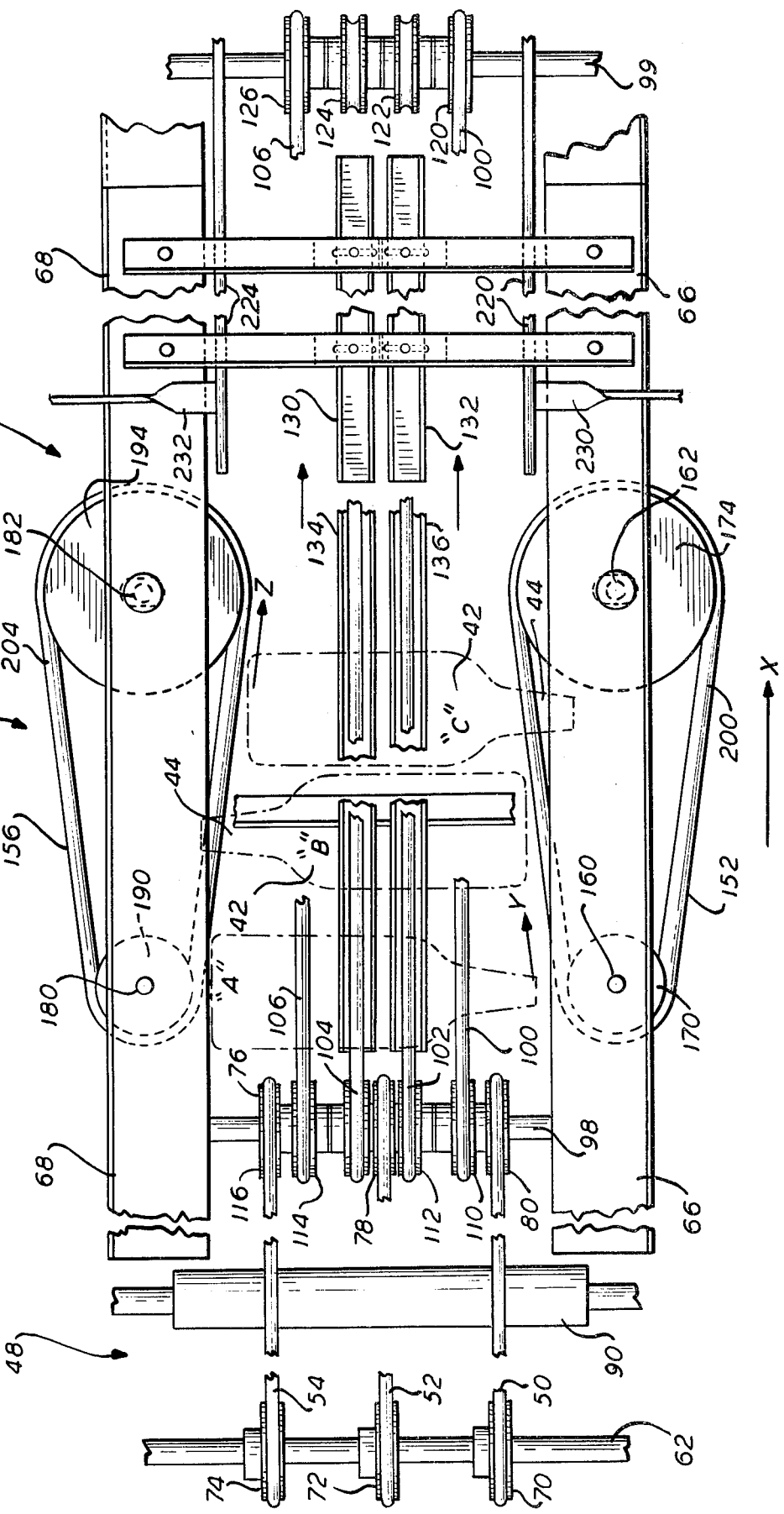

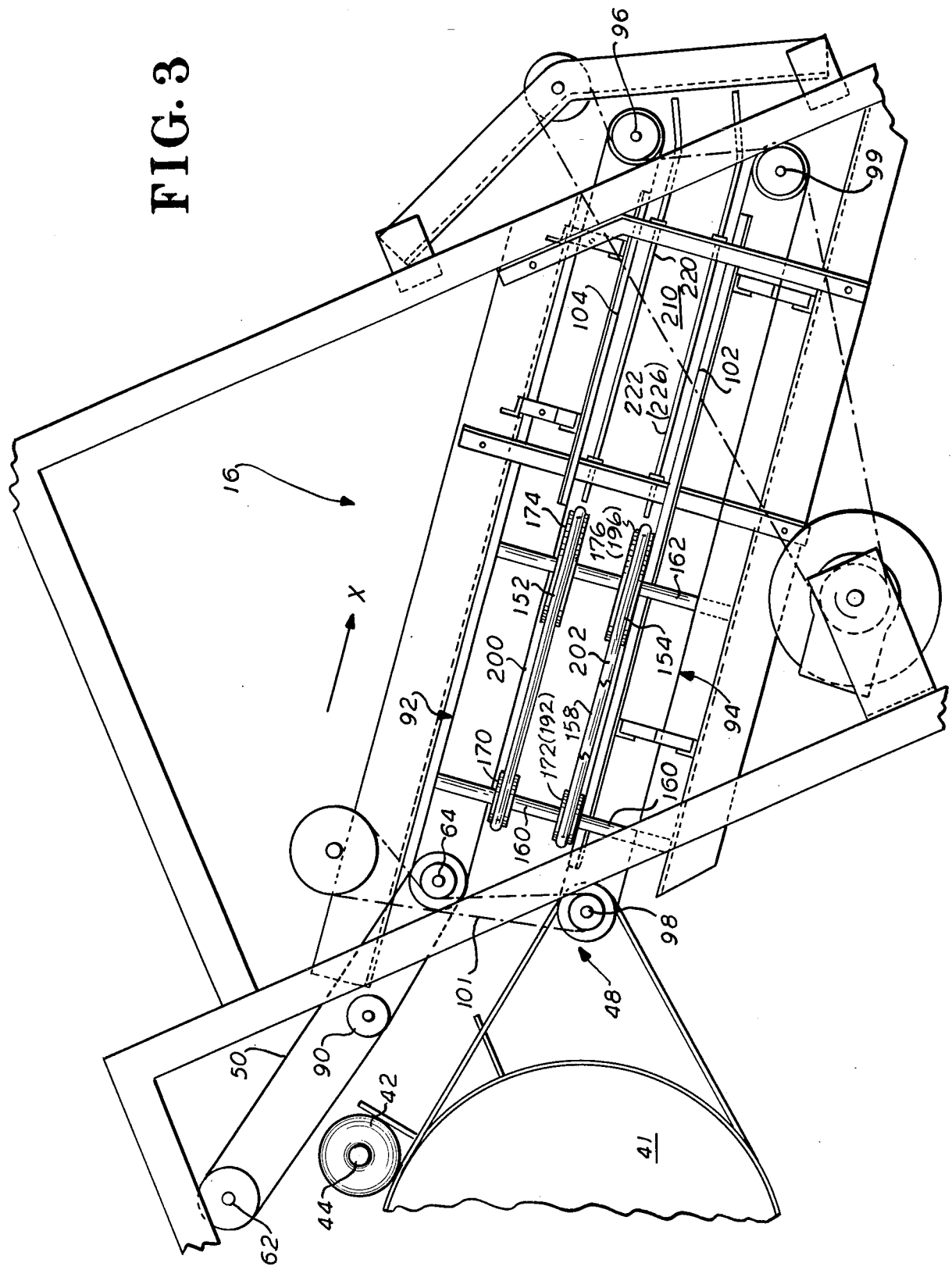

BOTTLE FEEDING AND ALIGNING MECHANISM

BACKGROUND OF THE INVENTION — FIELD OF APPLICATION

This invention relates to bottle feed and aligning mechanisms; and more particularly, to mechanisms for feeding necked bottles, while on their sides, and in such a manner as to align the bottles for further processing.

BACKGROUND OF THE INVENTION — DESCRIPTION OF THE PRIOR ART

There are various types and shapes of bottles used for distributing commodities today; probably as many sizes and shapes as there are things to be distributed.

One common shape or configuration of bottle is that of the common soda bottle with a main contents section and a neck through which the contents are poured from the bottle. The contents, obviously, must also be put into the bottle through that self same neck and to do so the bottles must be up-ended and set up for further processing, which may include cleaning, filling, capping, labeling etc..

Quite often such necked bottles are best put into the system by being loaded into the bottles processing equipment lying on their sides. Thereafter they are fed along a predetermined feed path to a twister which up ends the bottles and sends them on down the feed path for further processing. The twister will generally receive the bottles, while lying on their sides and with necks extending to either side (right or left) for example of the feed path; and will thereafter up-end the bottles. However, for most such twisters to function efficiently the bottles must be fed into the twister with at least their main or contents sections aligned.

Conventionally available equipment, for so aligning the contents or main sections of the bottles, usually comprise pairs of spaced and aligned rails which converge as they progress downstream along the feed path. Such rails, however, more often than not cause the bottles to skew as they are being fed along the feed path. This skewing can, and often does, jam up the feed line, requiring either operator attention to unjam same or shut down of the equipment; both time consuming and costly. In addition, such jams may also cause undue bottle breakage with attendant loss in bottles and broken glass which can damage the equipment and seriously hurt the operator.

SUMMARY OF THE INVENTION

It is therefore an object of this invention to provide a novel and improved bottle feed mechanism.

It is a further object of this invention to provide a novel and improved bottle feed and aligning mechanism.

It is a still further object of this invention to provide a novel and improved feed and aligning mechanism for bottles having necks.

It is yet still a further object of this invention to provide a novel and improved mechanism for feeding and aligning bottles while disposed on their sides.

It is yet still another object of this invention to provide a novel and improved mechanism for feeding and aligning bottles having necks and lying on their sides along a feed path and to a mechanism for up ending the bottles.

This invention involves bottle feed mechanisms; and contemplates providing a positive and driven aligning means for necked bottles being fed on their sides along a feed path. The aligning means includes a plurality of spaced, aligned and driven members which converge towards each other side to side in the downstream direction, and which coact with the bottles to align same irrespective of the side (right or left) of the feed path to which the bottle necks extend.

Other objects, features, and advantages of the invention in its details of construction and arrangement of parts, will be seen from the above, from the following description of the preferred embodiment when considered in conjunction with the drawings, and from the appended claims.

BRIEF DESCRIPTION OF THE DRAWING

In the drawings:

FIG. 2 is a plan view of the bottle feed and aligning mechanism of the bottle processing line of FIG. 1, and which incorporates the instant invention;

FIG. 3 is a side elevational view of the bottle feed and aligning mechanism of FIG. 2;

DESCRIPTION OF THE PREFERRED EMBODIMENT

For convenience the invention will be described as applied to a feed line for feeding plastic soda bottles while lying on their sides, downhill and into a mechanism for upending the bottles; it being understood, nevertheless that without departing from the scope of the invention that the bottles need not be soda bottles as long as they have necks, that they may be made of glass or other suitable material, and that they can just as well be fed along an uphill or horizontal path.

Figure 1:
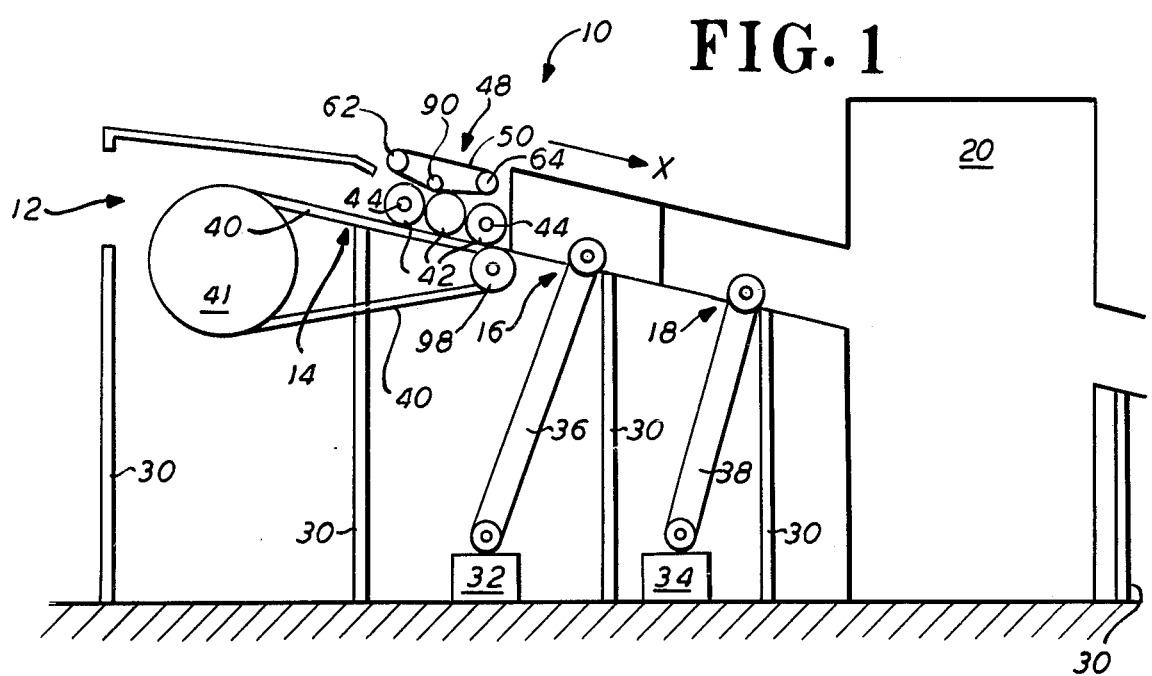
FIG. 1 is a schematic of a bottle processing line incorporating the instant invention.

With reference to FIG. 1, there is generally shown at 10 a bottle processing line including an infeed opening 12, an infeed section 14, an aligning mechanism 16, a twister 18, and a bottle processor 20 which may be a bottle washer, filler, etc.. Suitable supports 30 support and align the various mechanisms for co-operation one with the other and so on that the bottles may flow in a steady path to and through each section. Appropriate and conventional drive motors 32 and 34 are provided and are interconnected to the driven mechanisms by belts 36, 38 or other suitable means. Electrical power of appropriate characteristics is provided for motors 32 and 34 and suitable controls are provided therefor.

Bottle infeed section 14 includes a bottom belt 40 (FIG. 1) upon which bottles 42 are disposed so as to be lying on their sides. The necks 44 of bottles 42 may extend in either direction (as shown for bottles 42 shown in phantom mid-way in FIG. 2).

Infeed drive means 48 (FIGS. 1 and 2) are provided above and below the bottles so as to act upon sides of bottles 42 to move same along the feed path in the direction of arrow X (FIGS. 1, 2 and 3). The upper infeed drive means 48 includes a set of infeed drive belts 50, (FIG. 1) which act upon the sides of bottles 42 and are mounted on a pair of spaced cross-shafts 62 and 64. An idler roller 90 provides intermediate support for belts 50. The lower infeed drive means includes a drive belt 40 which acts on the lower sides of the bottles and is entrained around drum 41 and pulley 98. Suitable drive means, such as belt 36, interconnects power from motor 32 to a conventional drive means (not shown) to drive belts 50.

As bottles 42 exit infeed section 48 they are fed into and through aligning mechanism section 16. This is accomplished by an upper drive mechanism 92 (FIG. 3) which coacts with the upwardly disposed sides of bottles 42; and a lower drive mechanism 94 which coacts with the downwardly disposed sides of bottles 42. Since upper drive 92 and lower drive 94 are substantially identical only lower drive 94 will be described in detail. Suffice it to include that each includes four belts; with those of upper drive 92 entrained about pulleys disposed on cross-shafts 64 and 96 (FIG. 3) respectively, and with those of lower drive 94 entrained about pulleys disposed on cross-shafts 98 and 99. Cross-shafts 96, 98 and 99 like cross-shafts 62 and 64 are disposed between appropriate side supports. The drive from cross-shafts 64 not only drives upper drive 92 but is also transmitted by a belt 101 to cross-shaft 98 to drive lower drive 94.

Each drive includes four belts 100, 102, 104, 106 entrained at one end about pulleys 110, 112, 114 and 116 disposed on cross-shaft 98 and at their other end about pulleys 120, 122, 124 and 126 disposed on cross-shaft 99. Belt back-ups and guards 130, 132, 134, 136 are disposed proximate each belt and extend substantially the length thereof. Shaft 98 which is supported between side supports 66 and 68 supports pulleys 76, 78 and 80.

Figure 5:
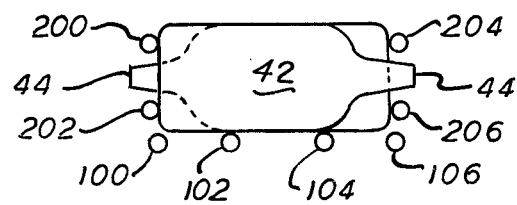
FIG. 5 is a schematic end view of the pair of bottles of FIG. 4 after they have moved further downstream in the feed path but while still in the aligning section thereof.
Figure 6:
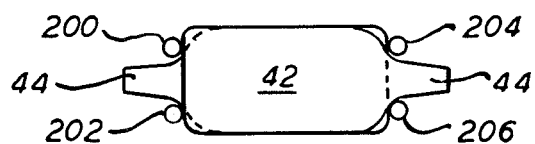
FIG. 6 is a schematic end view of the pair of bottles of FIG. 5, after they have been fully aligned.

Alignment of the main or contents sections of bottles 42 is accomplished while they are being moved through aligning section 16. This is accomplished by an alignment assembly 150 which includes four alignment sub-assemblies 152, 154, 156 and 158. Sub-assemblies 152, 154 are grouped in spaced relationship to one side of the feed path while sub-assemblies 156 and 158 are grouped in spaced relationship to the other side of the feed path. A pair of shafts 160, 162 support the sub-assembly pair 152, 154; with shaft 160 mounting a small pulley 170 of sub-assembly 152 in spaced relationship with a small pulley 172 of sub-assembly 154, and with shaft 162 mounting a large pulley 174 of sub-assembly 152 in spaced relationship with a large pulley 176 of sub-assembly 154. In similar manner a pair of shafts 180, 182 support sub-assembly pair 156, 158; with shaft 180 mounting a small pulley 190 of sub-assembly 156 in spaced relationship with a small pulley 192 of sub-assembly 158; and with shaft 182 mounting a large pulley 194 of sub-assembly 156 in spaced relationship with a large pulley 196 of sub-assembly 158. A first aligning belt 200 is entrained about pulleys 170, 174 to form sub-assembly 152. A second aligning belt 202 is entrained about pulleys 172, 176 to form sub-assembly 154. A third aligning belt 204 is entrained about pulleys 190, 194 to form sub-assembly 156; and a fourth aligning belt 206 is entrained about pulleys 192, 196 to form sub-assemblies 158. Suitable drive power is provided to shafts 160, 162, 180 and 182 to drive sub-assembly pair 152, 154 so that belts 200 and 202 will move in the direction of arrow Y (FIG. 2); and sub-assembly pair 156, 158 so that belts 204, 206 will move in the direction of arrow Z (FIG. 2) all so that bottles 42 will move along the feed path in the direction of arrow X. The size of pulley 170, 172, 174, 176, 190, 192, 194 and 196 are selected so that belts 200, 202, 204 and 206 form an aligning path which converges in the downstream direction of arrow X. The side to side spacing thereof is such that the moving belts coact with the bottles to move them into side to side alignment all as shown in FIGS. 4, 5 and 6.

As bottles 42 are moved along the feed path by belts 100, 102, 104, and 106 their bottom walls and upper edges (those to the sides of the bottle neck) are moved into contact with moving belts 200, 202, 204 and 206. It does not matter which direction the bottle necks extend since they will extend into spaces provided between belts 200 and 202 and belts 204 and 206 respectively. The converging disposition of driven belts 200, 202, 204 and 206 in co-operation with drive belts 100, 102, 104 and 106 acts upon bottles 42 and aligns the main or contents sections one behind the other (the respective bottle necks extending according to the bottles disposition).

Figure 4:
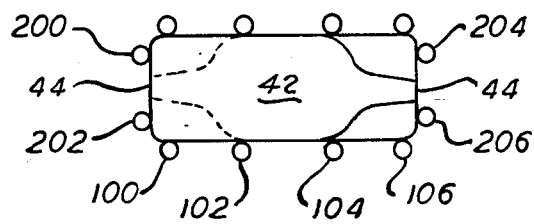
FIG. 4 is a schematic downstream end view of a pair of bottles in the bottle feed path aligning section.

Briefly in FIG. 4 the bottles are shown as they enter alignment assembly 150 (position A in FIG. 2). The bottles are offset so that the bottom of one bottle is in the same plane as the top of the other bottle and vice versa. In FIG. 5 the bottles are shown in position 8 in FIG. 2 where they have begun to be shifted horizontally by belts 200 and 204 to the final aligned position of FIG. 6. That final position (FIG. 6), position C in FIG. 2 is where the bottles are aligned so that the shoulder of one bottle (the shoulder being the region between the neck and the body) is substantially adjacent to the bottom of the other bottle and vice versa. In that position the necks will be projecting between belts 200 and 202 and 204 and 206 respectively. In this position the bottles can be input to a twister for settling them up on the bases for further processing, such as filling.

As bottles 42 move downstream along the feed path (in the direction of arrow X) they finally move into alignment as they exit aligning section 16 and move into exit section 210 wherein and throughout which, they are maintained aligned by a set of four longitudinally extending rods 220, 222, 224 and 226; which rods are appropriately disposed and supported between supports 66, 68 as by brackets 230, 232.

After aligned bottles 42 move from exit section 210 they enter a twister of conventional construction where they are up-ended for further processing. The alignment of bottles 42 facilitates operation of the twister.

From the above description it will thus be seen that a novel and improved bottle aligning mechanism has been provided; which mechanism aligns the main or contents sections of bottles, being fed along a path while lying on their sides, in a positive, efficient and relatively simple manner.

It is understood that although I have shown the preferred form of my invention that various modifications may be made in the details thereof without departing from the spirit as comprehended by the following claims.

I claim:

1. A mechanism for aligning the main or body portion of necked bottles as they move along a predetermined feed path while lying on their sides and irrespective of the side to side direction, with respect to said feed path, of the necks of the bottles comprising:

(a) first bottle directing means disposed to one side of the feed path and for coaction with a bottle, when moving along the feed path, to urge the bottle into a predetermined position with respect to the feed path, wherein said predetermined position with respect to the feed path is such that the successive bottles have their bottoms aligned with the shoulder portions of the bottles extending to either one side thereof or to the other side thereof;
(b) second bottle directing means disposed to the other side of the feed path and for coaction with a bottle, when moving along the feed path, to also urge the bottle into said predetermined position with respect to the feed path;
(c) said first and said second bottle directing means both extending for a predetermined distance in the general direction of movement of bottles along the feed path, and in a predetermined and converging bottle urging path in said direction of bottle movement; and
(d) said first and said second bottle directing means each including bottle urging means which move in said predetermined and converging bottle urging path and coact with bottles when moving therealong to urge the bottles into said predetermined position with respect to said feed path, wherein said first bottle directing means includes a pair of aligned and spaced endless belt bottle urging means one disposed above the other; and said second bottle directing means includes a pair of aligned and spaced endless belt bottle urging means one disposed above the other.

2. The aligning mechanism of claim 1, wherein said endless belts are of round cross-sectional configuration.

3. The aligning mechanism of claim 2; wherein (a) each of said bottle urging means includes a first pulley and a second pulley larger in diameter then said first pulley;
(b) said first pulley and said second pulley, of each of said bottle urging means, are co-planar and coact to entrain the endless belt associated therewith; and
(c) driven shaft means are provided for said pulleys to drive same in appropriate directions.

4. The aligning mechanism of claim 3, wherein there is a first shaft for the pair of first pulleys of each set of aligned bottle urging means; and a second shaft for the pair of second pulleys of each set of aligned bottle urging means.

5. The aligning mechanism of claim 4, wherein said second pulleys are disposed downstream, with respect to said direction of bottle feed, from said first pulleys.

6. The aligning mechanism of claim 5, including bottle feed means for moving bottles in said direction of bottle feed.

7. The aligning mechanism of claim 6, wherein said bottle feed means includes first bottle feed means disposed for coaction with bottles and above same when moving along said bottle feed path and second bottle feed means disposed for coaction with bottles and below same when moving along said bottle feed path.

8. The aligning mechanism of claim 1, wherein each endless belt urging means includes a first pulley and a second pulley larger in diameter then said first pulley.

* * * * *